US007809772B2

(12) United States Patent
Harada et al.

(10) Patent No.: US 7,809,772 B2
(45) Date of Patent: Oct. 5, 2010

(54) DATA CHANGE DEVICE, DATA GENERATION DEVICE, RELATED METHOD, RELATED RECORDING MEDIUM, AND RELATED COMPUTER DATA SIGNAL

(75) Inventors: Masahiko Harada, Ebina (JP); Goro Noda, Ebina (JP); Atsushi Takeshita, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 407 days.

(21) Appl. No.: 11/808,848

(22) Filed: Jun. 13, 2007

(65) Prior Publication Data

US 2008/0098021 A1 Apr. 24, 2008

(30) Foreign Application Priority Data

Oct. 24, 2006 (JP) ............................ 2006-288809

(51) Int. Cl.
*G06F 7/00* (2006.01)
*G06F 17/30* (2006.01)

(52) U.S. Cl. ...................................... 707/803; 707/796

(58) Field of Classification Search ....................... None
See application file for complete search history.

(56) References Cited

U.S. PATENT DOCUMENTS

| | | | | |
|---|---|---|---|---|
| 6,202,061 | B1 * | 3/2001 | Khosla et al. | 707/3 |
| 6,523,024 | B1 * | 2/2003 | Yajima et al. | 707/3 |
| 6,650,343 | B1 * | 11/2003 | Fujita et al. | 715/760 |
| 6,844,870 | B2 * | 1/2005 | Mukai et al. | 345/158 |
| 7,085,767 | B2 * | 8/2006 | Kusama | 707/101 |
| 7,549,753 | B2 * | 6/2009 | Gomez de Llarena | 353/13 |
| 2002/0041262 | A1 * | 4/2002 | Mukai et al. | 345/30 |
| 2002/0161762 | A1 * | 10/2002 | Morita et al. | 707/7 |
| 2002/0163592 | A1 * | 11/2002 | Ueda | 348/602 |
| 2003/0234871 | A1 * | 12/2003 | Squilla et al. | 348/220.1 |
| 2005/0036168 | A1 * | 2/2005 | Shoji et al. | 358/1.15 |
| 2006/0195481 | A1 * | 8/2006 | Arrouye et al. | 707/104.1 |

FOREIGN PATENT DOCUMENTS

| | | |
|---|---|---|
| JP | A-2000-056888 | 2/2000 |
| JP | A-2000-200129 | 7/2000 |
| JP | A 2005-352914 | 12/2005 |

* cited by examiner

*Primary Examiner*—Kuen S Lu
*Assistant Examiner*—Tuan Pham
(74) *Attorney, Agent, or Firm*—Oliff & Berridge, PLC

(57) ABSTRACT

There is provided a data change device that includes a storage unit that stores a manipulation explanation data set and a result explanation data set related to each other, the manipulation explanation data set including at least an instruction acceptance image indicating an instruction acceptance unit for accepting an instruction to the data change device or an external device and a manipulation explanation image for explaining a manipulation of the instruction acceptance unit, and the result explanation data set indicating a phenomenon that results from a manipulation indicated by the manipulation explanation data set, a change acceptance unit that accepts a change to be made to the instruction acceptance unit, and a manipulation explanation data change unit that changes the manipulation explanation data set in accordance with the change if the change is accepted by the change acceptance unit.

12 Claims, 12 Drawing Sheets

DATA CHANGE DEVICE, DATA GENERATION DEVICE, RELATED METHOD, RELATED RECORDING MEDIUM, AND RELATED COMPUTER DATA SIGNAL

CROSS-REFERENCE TO RELATED APPLICATION(S)

This application is based on and claims priority under 35 USC 119 from Japanese Patent Application No. 2006-288809 filed Oct. 24, 2006.

BACKGROUND

1. Technical Field

The present invention relates to a data change device, data generation device, a related method, a related recording medium, and a related computer data signal.

2. Related Art

Information devices such as printers or copiers have attained high functionality, as a result of which consideration has been given to their incorporation into solutions for assisting manipulation of information devices.

SUMMARY

According to one aspect of the invention, a data change device includes: a storage unit that stores a manipulation explanation data set and a result explanation data set related to each other, the manipulation explanation data set including at least an instruction acceptance image indicating an instruction acceptance unit for accepting an instruction to the data change device or an external device and a manipulation explanation image for explaining a manipulation of the instruction acceptance unit, and the result explanation data set indicating a phenomenon that results from a manipulation indicated by the manipulation explanation data set; an output unit that outputs the result explanation data set stored in the storage unit, and the manipulation explanation data set related to the result explanation data set; a change acceptance unit that accepts a change to be made to the instruction acceptance unit; and a manipulation explanation data change unit that changes the manipulation explanation data set in accordance with the change if the change is accepted by the change acceptance unit. This exemplary embodiment is called as the first aspect of the invention in this section.

BRIEF DESCRIPTION OF THE DRAWINGS

Exemplary embodiment(s) of the present invention will be described in detail based on the following figures, wherein.

DETAILED DESCRIPTION

An exemplary embodiment of the invention will now be described with reference to the accompanying drawings.

(Structure)

Figure 1:
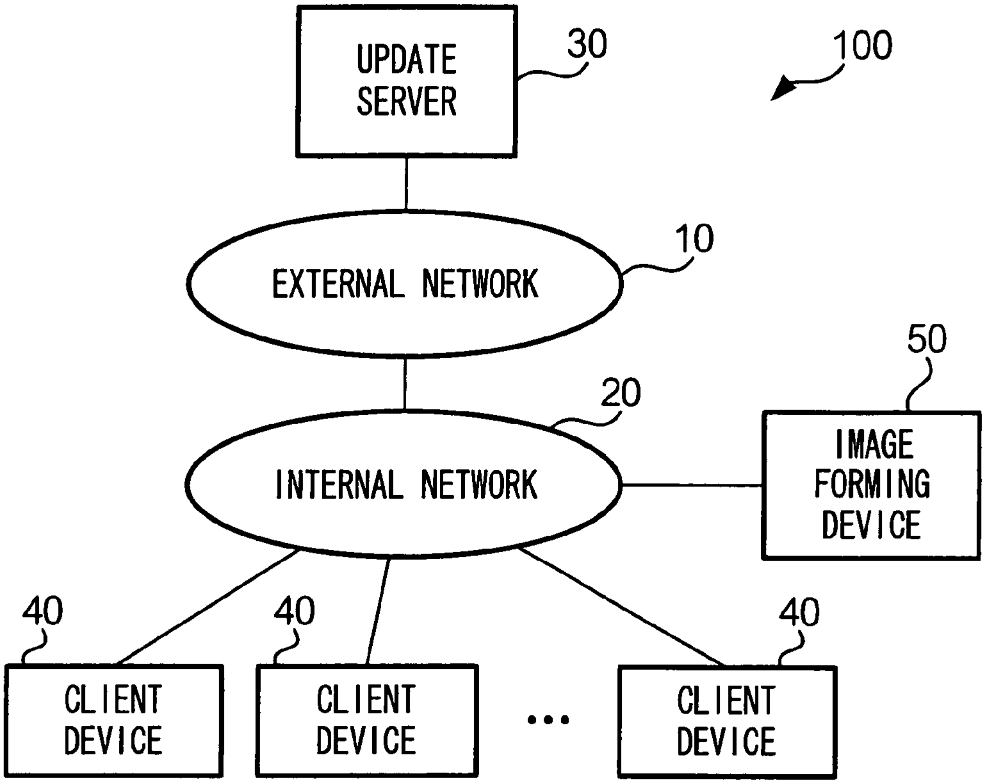
FIG. 1 shows an entire structure of a network print system according to an exemplary embodiment of the invention.

FIG. 1 schematically shows an entire structure of a network print system 100 according to an exemplary embodiment of the invention. As shown in the figure, the network print system 100 has an external network 10, an internal network 20, an update server 30, plural client devices 40, and an image forming device 50.

The external network 10 is a network of a relatively large scale, which is directed to public use. The external network 10 is constituted, for example, by the internet and a public switched telephone network. The internal network 20 is a network of a relatively small scale established inside an office or the like. The internal network 20 is, for example, a LAN (Local Area Network). The internal network 20 has a server device (not shown) which is connected so as to be able to communicate with the external network 10.

Figure 2:
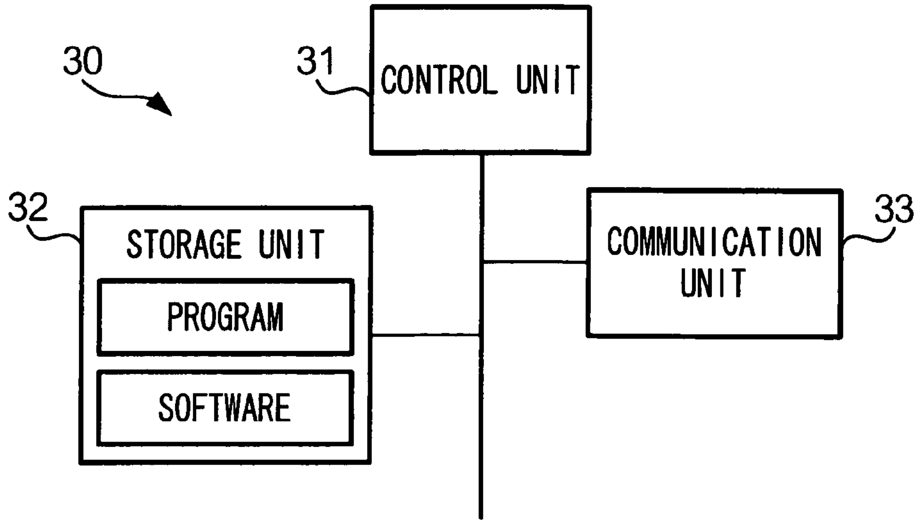
FIG. 2 is a block diagram showing an example of a structure of an update server.

The update server 30 is a server device connected to the external network 10. As shown in FIG. 2, for example, the update server 30 has a controller 31, a storage unit 32, and a communication unit 33. The controller 31 has an arithmetic processing device such as a CPU (Central Processing Unit), and a storage device such as a ROM (Read Only Memory) or RAM (Random Access Memory). The controller 31 executes programs stored in the ROM and the storage unit 32, to control operation of respective parts of the update server 30. The storage unit 32 has a storage device such as a HDD (Hard Disk Drive), and stores programs for realizing functions of a server device and software usable from the image forming device 50. The software stored in the storage unit 32 is a set of data and programs which are required by the image forming device 50 to realize predetermined functions. The software stored in the storage unit 32 can be added or updated with new data or a new program. The communication unit 33 is an interface device for enabling communication with the external network 10.

Figure 3:
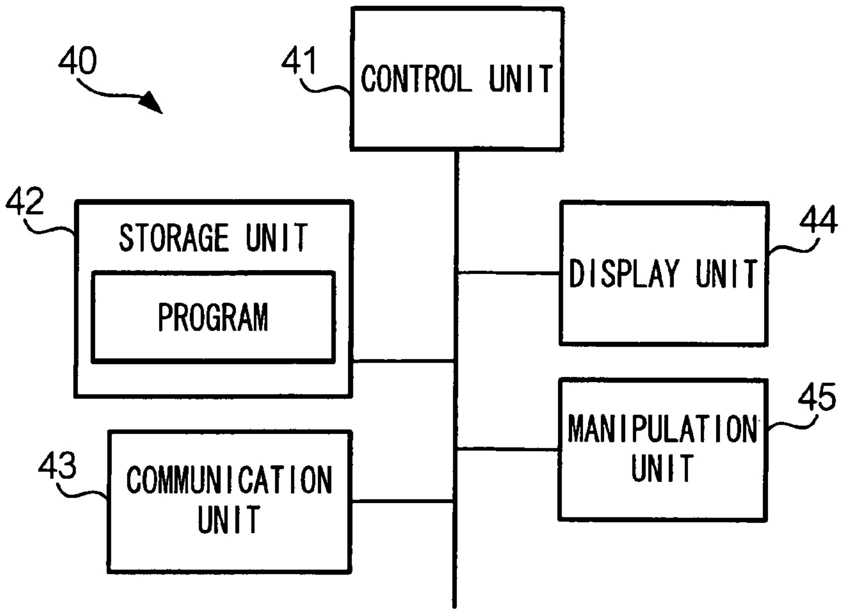
FIG. 3 is a block diagram showing an example of a structure of a client device.

The client device 40 is a computer device connected to the internal network 20. For example, a personal computer is used as the client device 40. As shown in FIG. 3, the client device 40 has a controller 41, a storage unit 42, a communication unit 43, a display 44, and a manipulation unit 45. The controller 41 has an arithmetic processing device such as a CPU, and a storage device such as a ROM or RAM. The controller 41 executes programs stored in the ROM or storage unit 42, to control operation of respective parts of the client device 40. The storage unit 42 has, for example, a storage device such as a HDD and stores programs which allow users to create a document including text and images, and programs for conducting communication with the image forming device 50. The communication unit 43 is, for example, an interface device for carrying out communication with the internal network 20. The display 44 includes, for example, a display device such as a liquid crystal display and displays images corresponding to image data supplied from the controller 41. The manipulation unit 45 has an input device such as a keyboard or a mouse and supplies manipulation signals corresponding to manipulations conducted by users.

Figure 4:
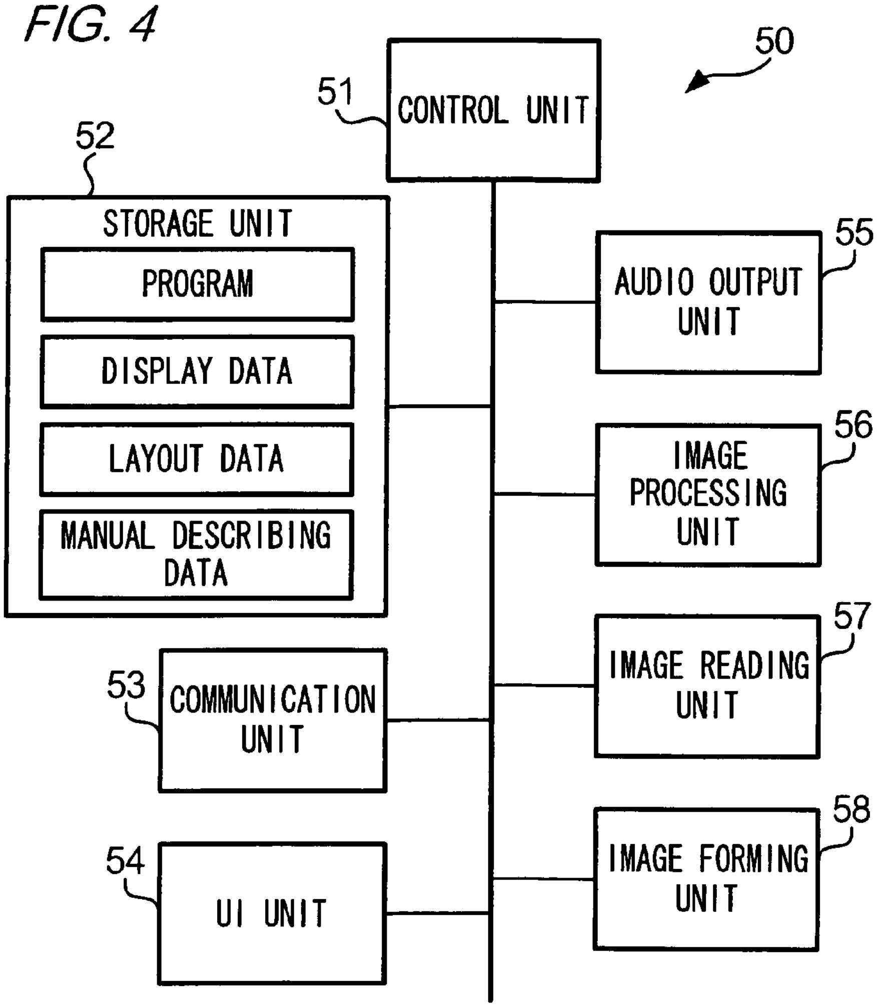
FIG. 4 is a block diagram showing an example of a structure of an image forming device.

The image forming device 50 is an information device having an image forming function (hereinafter a "print function"), an image reading function (hereinafter a "scan function"), and a facsimile communication function (hereinafter a "fax function"). As shown in FIG. 4, the image forming device 50 has a controller 51, a storage unit 52, a communication unit 53, a UI (User Interface) unit 54, an audio output unit 55, an image processing unit 56, an image reading unit 57, and an image forming unit 58. The controller 51 has, for example, an arithmetic processing device such as a CPU, and a storage device such as a ROM or RAM. The controller 51 executes programs stored in the ROM or storage unit 52, to control respective parts of the image forming device 50. The storage unit 52 has, for example, a storage device such as a HDD, and stores programs for realizing the print function, scan function, and fax function, display of data sets representing instruction acceptance images displayed on the UI unit 54, and layout of data sets describing layouts of the respective display data sets, and manual describing data sets for assisting users to carry out a variety of procedures required to conduct a variety of processing operations. The instruction acceptance images are displayed to accept instructions relating to predetermined processing operations, and include, for example, buttons, tabs, check boxes, scroll bars, and the so on. Each of the display data sets is provided with identification information for specifying uniquely a corresponding display data set. The identification information is, for example, information indicating a layout of a corresponding display data set or a file name of a corresponding display data set. The communication unit 53 is, for example, an interface device for conducting communication with the internal network 20.

Figure 5:
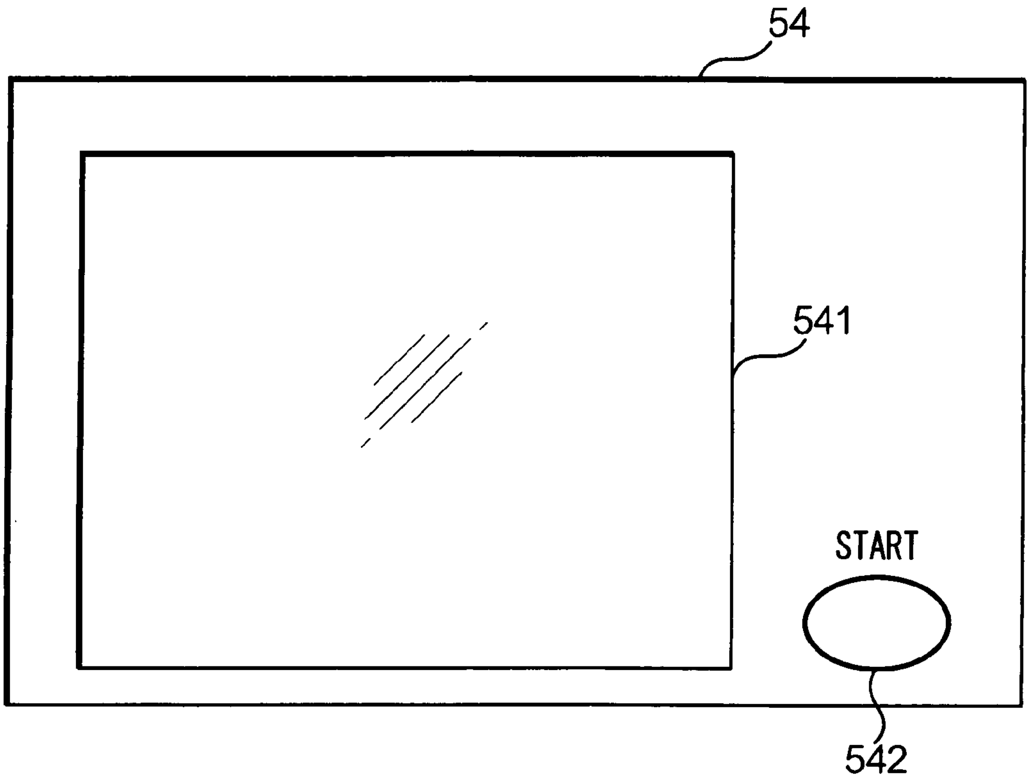
FIG. 5 shows an example of an appearance of a UI unit of the image forming device.

The UI unit 54, for example, accepts manipulations conducted by users and notifies the users of a variety of relevant information by presenting to the users image information. That is, the UI unit 54 serves both as an input device and a display device. FIG. 5 shows an example of an outer appearance of the UI unit 54. As shown in the figure, the UI unit 54 includes a touch panel 541 and a button 542.

The touch panel 541 is constituted by, for example, providing a transparent matrix switch on an upper face of a liquid crystal display. The liquid crystal display has a predetermined display area and shows images according to image data sets supplied from the controller 51. The matrix switch functions as plural switches respectively constituted of small areas, into which the display area of the liquid crystal display is divided. The matrix switch senses presence or absence of touch on each of the small areas by a user. If the touch panel 541 senses touch on a part corresponding to a button in a case where an instruction acceptance image equivalent to a button is displayed on the liquid crystal display, the touch panel 541 supplies the controller 51 with a manipulation signal indicating that the instruction acceptance image is selected. That is, the touch panel 541 displays an instruction acceptance image in a manner that the position of the displayed instruction acceptance image functions as a unit for accepting an instruction to the image forming device 50.

The button 542 is provided to allow users to instruct start of image reading processing or image forming processing (a so-called start button). The UI unit 54 can be equipped with other buttons than the button 542.

The audio output unit 55 has, for example, a speaker and outputs audio data supplied from the controller 51. That is, the audio output unit 55 informs users of a variety of information by output of audio.

The image processing unit 56 has an integrated circuit for image processing, such as an ASIC (Application Specific Integrated Circuit), and executes predetermined image processing operations on an image data set generated by the image reading unit 57 and another image data set supplied to the image processing unit 58. The image reading unit 57 has a function of a so-called scanner. The image reading unit 57 optically reads an original document and generates an image data set showing the original document. The image forming unit 58 forms an image on a sheet-type material such as a paper sheet, according to an electrophotography method. Alternatively, the image forming unit 58 can form an image, according to a different method (an inkjet method or thermal transfer method) from the electrophotography method.

Figure 6:
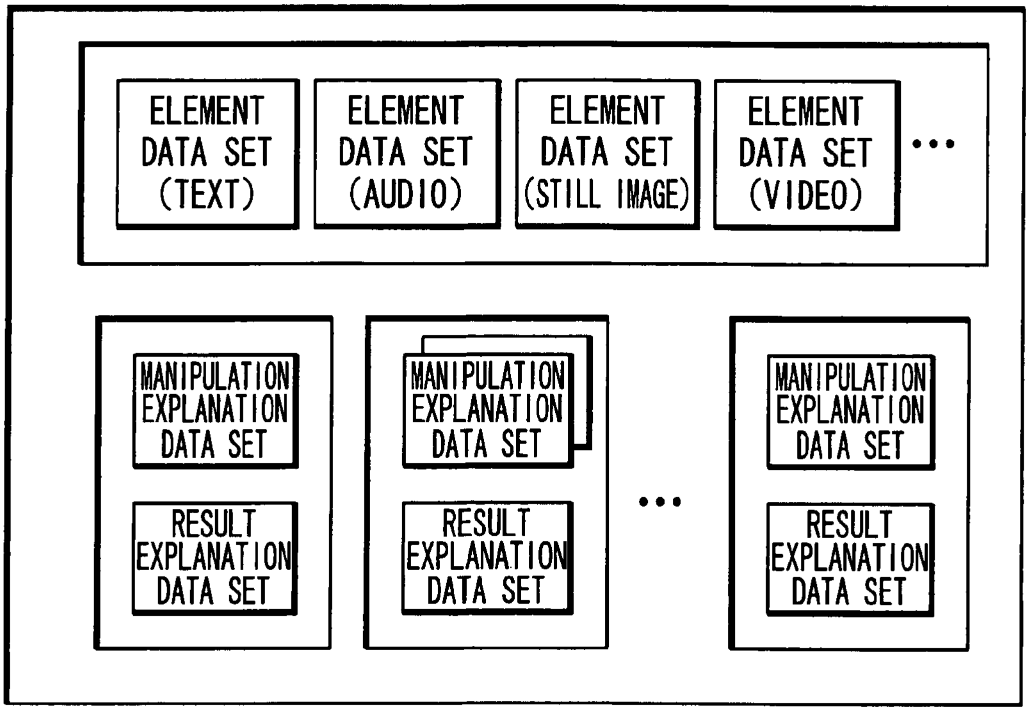
FIG. 6 shows an example of a structure of manual data.

A structure of a manual data set stored in the storage unit 52 will now be described. FIG. 6 shows an example of the structure of a manual data set. As shown in the figure, the manual data set includes plural element data sets, plural manipulation explanation data sets, and plural result explanation data sets. The manipulation explanation data sets and the result explanation data sets are stored respectively for various processing operations which can be executed by the image forming device 50. Each of the element data sets, manipulation explanation data sets, and result explanation data sets is given identification information for uniquely specifying the corresponding data set. This identification information is similar to the identification information, which has already been described in this text.

The element data sets each express substantial content of either a manipulation explanation data set or result explanation data set. The element data sets each include data for outputting text or audio instructing, for example, "Press this button" or "This screen will be displayed", or for outputting image data (still image data or video data) showing a display state of the touch panel 541 when displaying or reproducing such data. The element data sets include data common to the display data sets. For example, data common to a display data set can be an image data set corresponding to an instruction acceptance image.

The element data sets each include an image data set corresponding to a manipulation explanation image. The manipulation explanation image is an image which depicts a manipulation using the touch panel 541, e.g., an image showing the above-mentioned text stating "Press this button" or an image showing a figure indicative of an intended instruction acceptance image. That is, the manipulation explanation image is displayed in relation to a predetermined instruction acceptance image.

Figure 7:
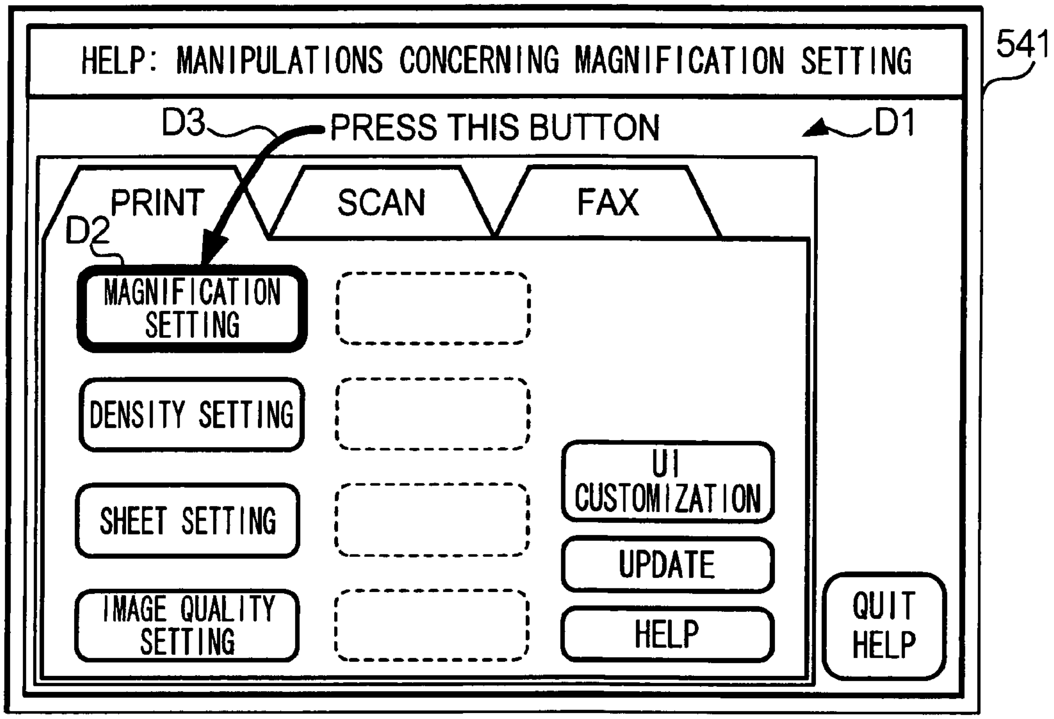
FIG. 7 shows an example of images displayed on a touch panel of the image forming device.

FIG. 7 shows an example of the manipulation explanation image. This figure shows a manipulation explanation image in which an instruction acceptance image depicting "Magnification setting" is an instruction target for which an instruction is to be provided. Images D1, D2, and D3 are drawn as manipulation explanation images. The image D1 depicts text reading "Press this button". The image D2 depicts a figure (a frame) for emphasizing an instruction acceptance image ("Set magnification" in this case) as an instruction target and has a shape similar to the contour of instruction acceptance images. That is, the image D2 is drawn using a broader line than those forming the contour of instruction acceptance images. Therefore, an instruction acceptance image overlaid with the image D2 will have a different appearance from other instruction acceptance images which are normally displayed. In this case, the image D3 shows an arrow which connects each of the images D1 and D2.

As the image showing an arrow, an appropriate shape can be selected from among plural predetermined shapes. Alternatively, end points (one of which is a start point) of an arrow can be defined in advance at appropriate positions of the images D1 and D2, and, an appropriate shape (an arrow in this case) can be generated so as to connect the end points. In the latter case, the controller 51 generates an arrow-like image, as described above, based on information indicative of end points.

Description will now be made referring again to FIG. 6. The manipulation explanation data sets each explain user's manipulation required for executing a processing. In this exemplary embodiment, each manipulation explanation data set includes an element reference area, a history reference area, and a result reference area. The element reference area is an area for writing identification information of an element data set used in a corresponding manipulation explanation data set. The element reference area defines a position at which text data or still image data is displayed, and also defines a timing at which either audio data or video data is reproduced. The history reference area is an area for writing identification information for other manipulation explanation data sets in a case that plural manipulation explanation data sets relate to a single processing operation. The result reference area is an area for writing identification information of a result explanation data set that relates to a corresponding manipulation explanation data set.

Each of the result explanation data sets explains a result of a manipulation required to be conducted by a user to execute a processing operation. In this exemplary embodiment, each of the result explanation data sets includes an element reference area, a history reference area, and a manipulation reference area. The element reference area is an area for writing identification information of an element data set used in a corresponding result explanation data set, and is the same as the element reference area in a manipulation explanation data set (although the actual written identification information differs). The history reference area is an area for writing identification information for manipulation of explanation data sets (other than a newest manipulation explanation data set) which data sets are were referred to in a case that plural manipulation explanation data sets are related to the result explanation data set. The manipulation reference area is an area for writing identification information of the newest manipulation explanation data set related to a corresponding result explanation data set.

As described above, single or plural manipulation explanation data sets can be related to one result explanation data set. Under factory default settings, one manipulation explanation data set is basically related to one result explanation data set. When a display state or the like of the touch panel 541 is changed thereby necessitating a change to a manipulation explanation data set, a new manipulation explanation data set is added by the controller 51 in compliance with the changed display state. In this case, the manipulation explanation data set which was used previously is not deleted and is stored as history of the manipulation explanation data set.

(Operation)

With the structure as described above, the image forming device 50 reads or forms images or carries out facsimile communication. The image forming device 50 is capable of accepting a user's manipulations through the UI unit 54 and also of accepting a user's manipulations through the communication unit 53 from a client device 40. In the latter case, the client device 40 stores programs for realizing operations equivalent to manipulations through the UI unit 54.

Functions implemented in the image forming device 50 according to this exemplary embodiment will now be described. At first, the image forming device 50 has a print function, scan function, and fax function. These three functions are added with further functions of setting details of processing operations for realizing the three functions. Alternatively, the three functions each can be attained by any other known method. In the following description, the print function, scan function, and fax function will be referred to as "main functions", to have the meaning of primary functions of the image forming device 50.

In addition, the image forming device 50 is implemented with subsidiary functions in addition to its main functions. Such subsidiary functions are, for example, a "UI customization function" for changing display states of the touch panel 541, an "update function" for updating functions of the image forming device 50, and a "help function" for explaining manipulations concerning the functions of the image forming device 50 and results of the manipulations. Hereinafter, these functions will be described individually.

The UI customization function is used to change a layout or the like of instruction acceptance images displayed on the UI unit 54 for a user's convenience.

The update function is to update functions which can be realized by the image forming device 50. The term "update" used here is intended to cover not only changes to existing functions but also addition of a new function which has not ever been implemented. That is, if a function is updated by the update function, a processing operation corresponding to the function is changed or added.

More specifically, the update function is realized when the controller 51 of the image forming device 50 sends a request to the update server 30. In response to the request from the image forming device 50, the controller 31 of the update server 30 reads available software for the image forming device 50 from the storage unit 32, and supplies the software through the external network 10. The controller 51 updates a function corresponding to the software, by installing the supplied software. In some cases, the controller 51 causes a layout of instruction acceptance images displayed on the UI unit 54 to be changed in accordance with the update of the function, e.g., in accordance with a change to or addition of a processing Operation. A user's manipulations can then be changed accordingly. In such cases, the controller 51 rewrites a layout data set stored in the storage unit 52 so as to reflect a content of the change.

The help function used is to explain manipulations required for realizing functions implemented in the image forming device 50, and phenomena which result form the manipulations. For example, the help function indicates a manipulation that is required to be carried out to execute a processing operation for realizing a function; and also shows an exemplary result of execution of the processing operation in accordance with the manipulation. The help function is realized by a manual data set stored in the storage unit 52. More specifically, if a user selects execution of the help function, the controller 51 of the image forming device 50 reads a manual data set relating to a manipulation for which the user wishes to receive an explanation, from the storage unit 52. The controller 51 further controls the UI unit 54 or audio output unit 55 to output (display or reproduce) an image or sound according to the data. At this time, the controller 51 interprets a manipulation explanation data set and a result explanation data set, and outputs an image or sound at an appropriate position or timing. The controller 51 executes an output according to the manipulation explanation data set, and then executes the output according to the result explanation data set.

Figure 8:
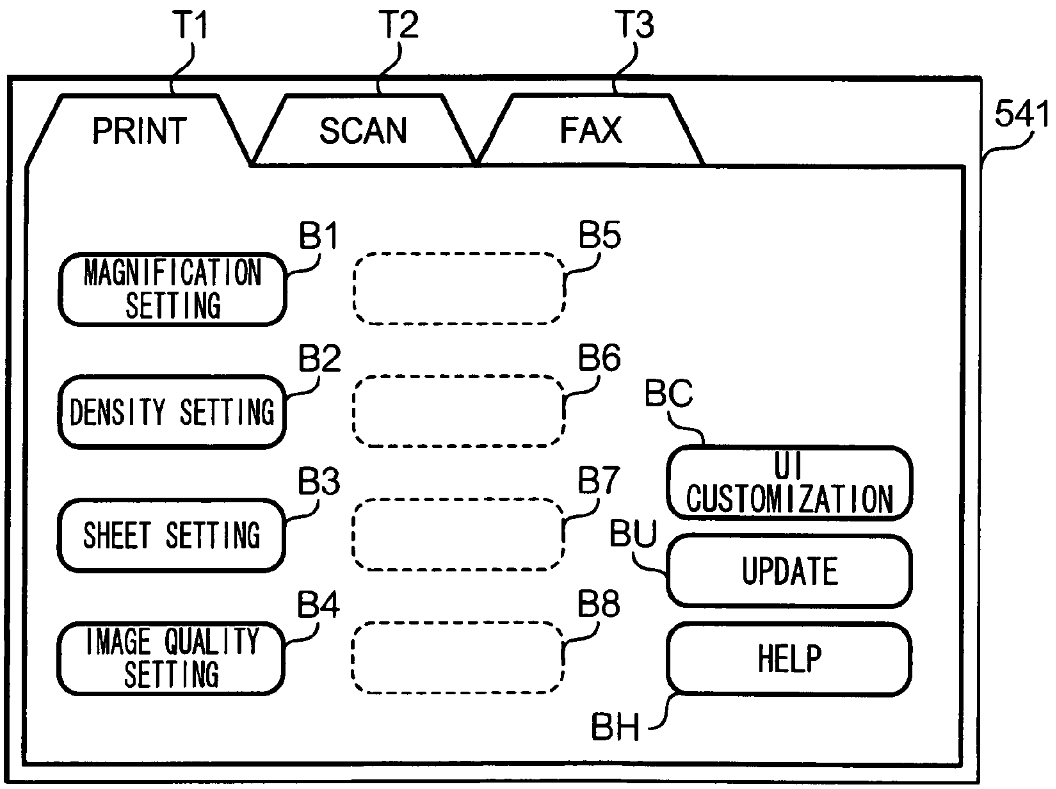
FIG. 8 also shows an example of images displayed on the touch panel of the image forming device.

The UI customization function, update function, and help function will now be described together with reference to a display on the touch panel 541. FIG. 8 shows an example of images displayed on the touch panel 541. As shown in the figure, the touch panel 541 displays plural instruction acceptance images which respectively correspond to predetermined functions. At this time, the layout of the instruction acceptance images displayed on the touch panel 541 is based on a layout data set stored in the storage unit 52. That is, the controller 51 refers to the layout data set in the storage unit 52 and generates an image data set in which instruction acceptance images are laid out as described in the layout data set. The controller 51 supplies the generated image data set to the touch panel 541.

At an upper part of the touch panel 541, instruction acceptance images T1, T2, and T3 in the form of tabs are displayed. The instruction acceptance images T1, T2, and T3 respectively correspond to the main functions, i.e., the print function, scan function, and fax function. If any one of the instruction acceptance images T1, T2, and T3 is selected by a user, the controller 51 performs a control operation so that instruction acceptance images B1 to B8 in the form of buttons, which are related to the selected function, are displayed below the tab-like instruction acceptance images T1, T2, and T3.

The instruction acceptance images B1 to B8 displayed below the tab-like instruction acceptance images T1, T2, and T3, which are images showing buttons that relate to functions of setting details concerning any of the main functions. The example shown in FIG. 8 depicts instruction acceptance images showing functions of setting details that relate to a print function. In the case of the example shown in this figure, the instruction acceptance image B1 relates to a magnification setting function, i.e., a function for setting a magnification level of an image when forming the image. The other instruction acceptance images B2, B3, and B4 respectively relate to a density setting function (a function of setting a density when forming an image), a sheet setting function (a function of setting a size or type of a sheet adopted when forming an image), and an image quality setting function (a function of setting image quality when forming an image).

Figure 9:
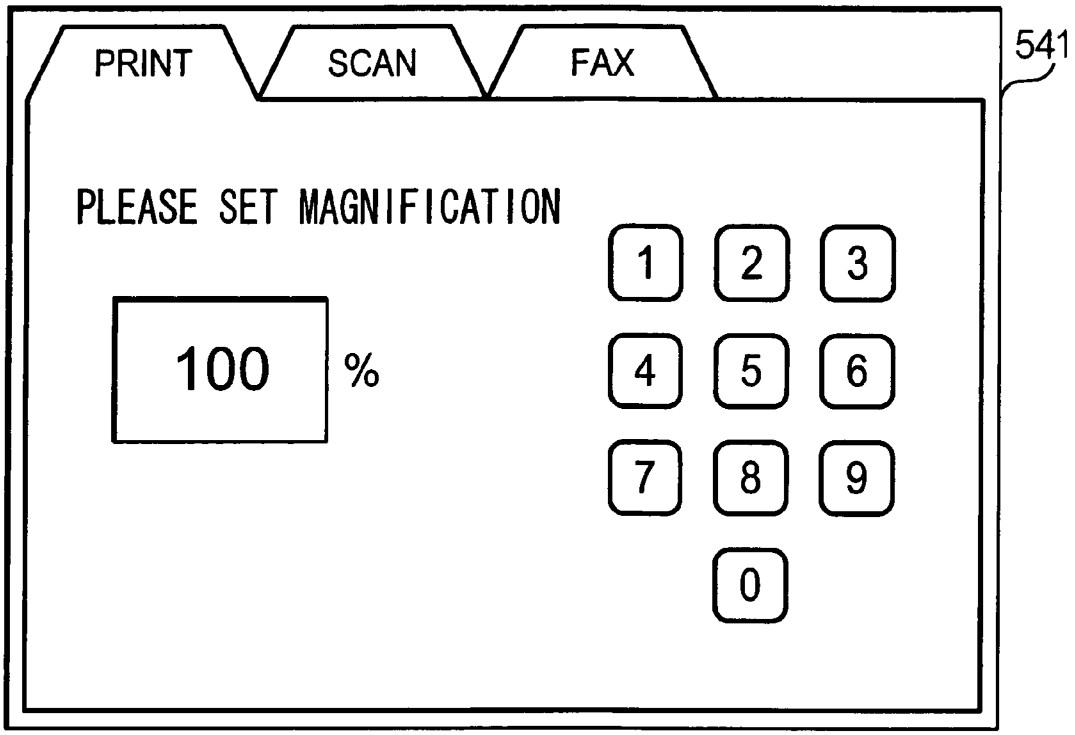
FIG. 9 also shows an example of images displayed on the touch panel of the image forming device.

For example, if the instruction acceptance image B1 is selected by a user, the controller 51 causes images shown in FIG. 9 to be displayed on the touch panel 541. In this case, a processing operation corresponding to the instruction acceptance image B1 causes the images shown in FIG. 9 to be displayed on the touch panel 541. At this time, the user can select a desired magnification by selecting any of instruction acceptance images “1” to “0”. For example, if the user sequentially selects “7” and “0”, the magnification is set to “70” %.

Instruction acceptance images B5 to B8 indicated by broken lines in FIG. 8 are not actually displayed. These instruction acceptance images are displayed when corresponding instruction acceptance images need to be displayed at positions denoted by the broken lines. For example, the instruction acceptance images B5 to B8 are displayed when a layout of the touch panel 541 is changed by the UI customization function or when a new function is added by the update function. That is, areas corresponding to the instruction acceptance images B5 to B8 are reserved in advance as extra areas for the UI customization function or update function.

Below the tab-like instruction acceptance images T1, T2, and T3, instruction acceptance images BC, BU, and BH are displayed in addition to the instruction acceptance images B1 to B8. The instruction acceptance images BC, BU, and BH are respectively related to the UI customization function, update function, and help function. For example, if the instruction acceptance image BU is selected by the user, the controller 51 executes a processing operation corresponding to the update function in a manner as schematically described above.

Figure 10:
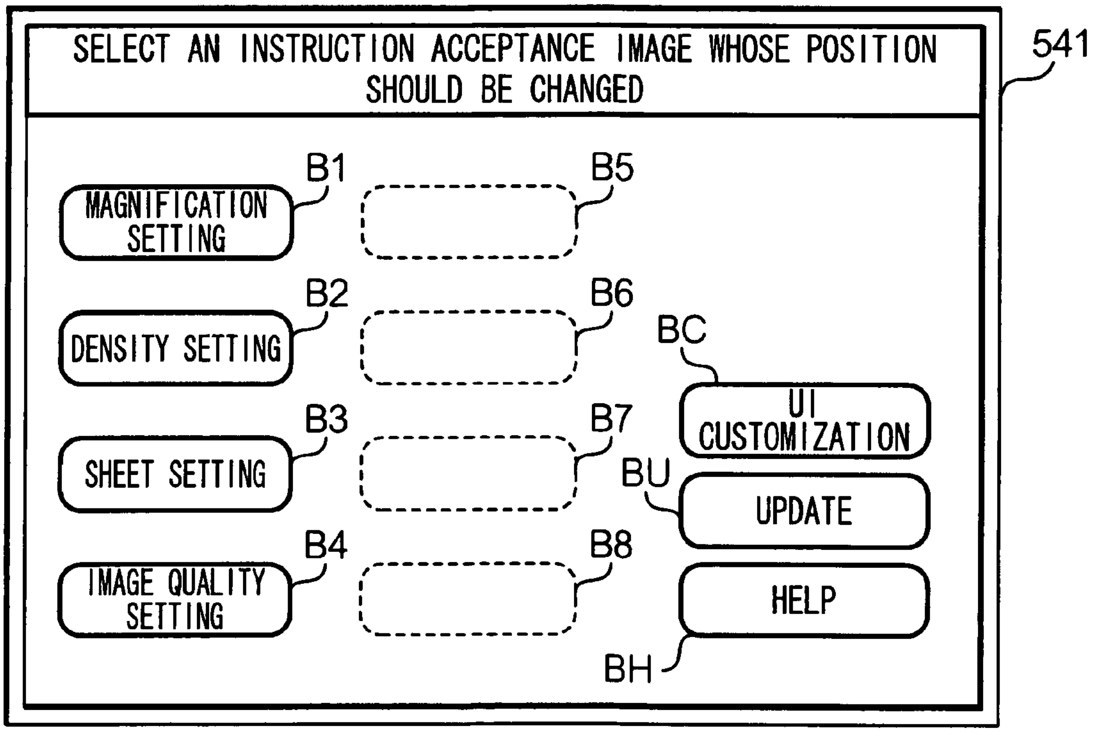
FIG. 10 also shows an example of images displayed on the touch panel of the image forming device.

If the instruction acceptance image BC is selected by the user, the controller 51 executes a processing operation corresponding to the UI customization function. More specifically, the controller 51 obtains a manipulation signal corresponding to the instruction acceptance image BC and then enters into a state of accepting a change to the layout of the touch panel 541. At the same time, the controller 51 controls the touch panel 541 to display images which allow the user to select instruction acceptance images for changing positions. FIG. 10 shows an example of images which the touch panel 541 is currently displayed at this time. While the touch panel 541 shows these images, the user selects an instruction acceptance image a position of which the user desires to change.

Figure 11:
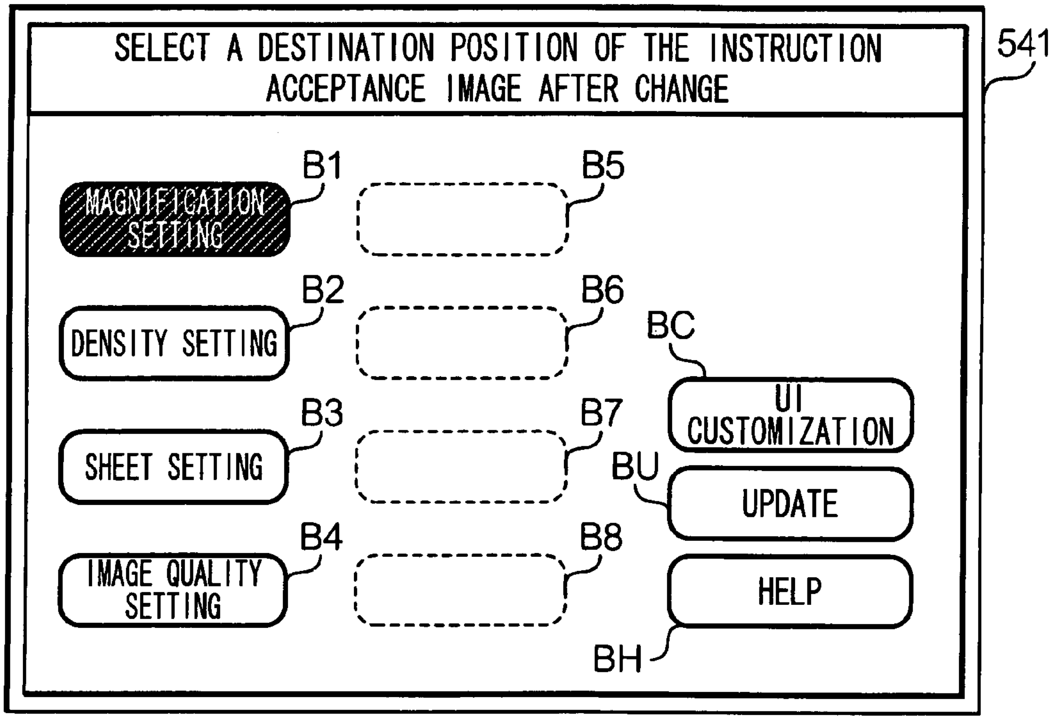
FIG. 11 also shows an example of images displayed on the touch panel of the image forming device.
Figure 12:
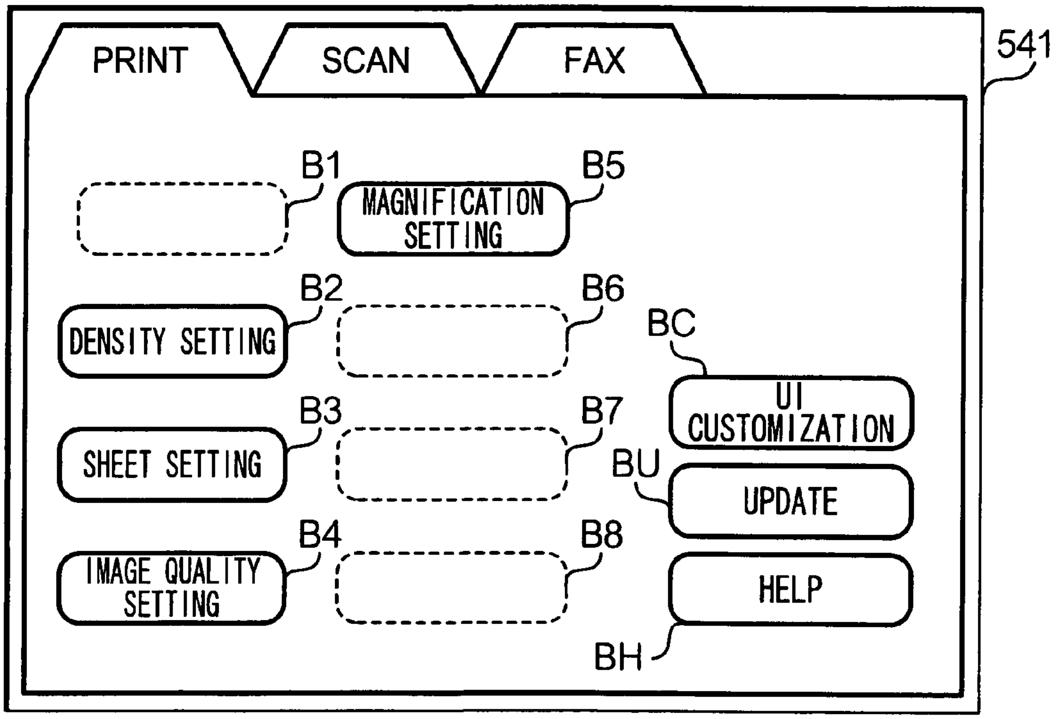
FIG. 12 also shows an example of images displayed on the touch panel of the image forming device.

If the user then selects one or more of the instruction acceptance images, the controller 51 causes the touch panel 541 to display images as shown in FIG. 11. The example in this figure shows a case where the instruction acceptance image B1 is selected. To emphasize the selected instruction acceptance image, the instruction acceptance image as a target is displayed in a different color from colors of the other instruction acceptance images. While the touch panel 541 shows these images, the user elects a destination to which the instruction acceptance image of the magnification setting function is to be moved. At this time, if the user selects an area corresponding to the instruction acceptance image B5, for example, the controller 51 causes the touch panel 541 to display the images shown in FIG. 12, and terminates the processing operation corresponding to the UI customization function. Accordingly, the instruction acceptance image corresponding to the magnification setting function is moved from the position of B1 to the position of B5. At this time, the controller 51 rewrites a layout data set stored in the storage unit 52 and reflects a content of this positional change.

Figure 13:
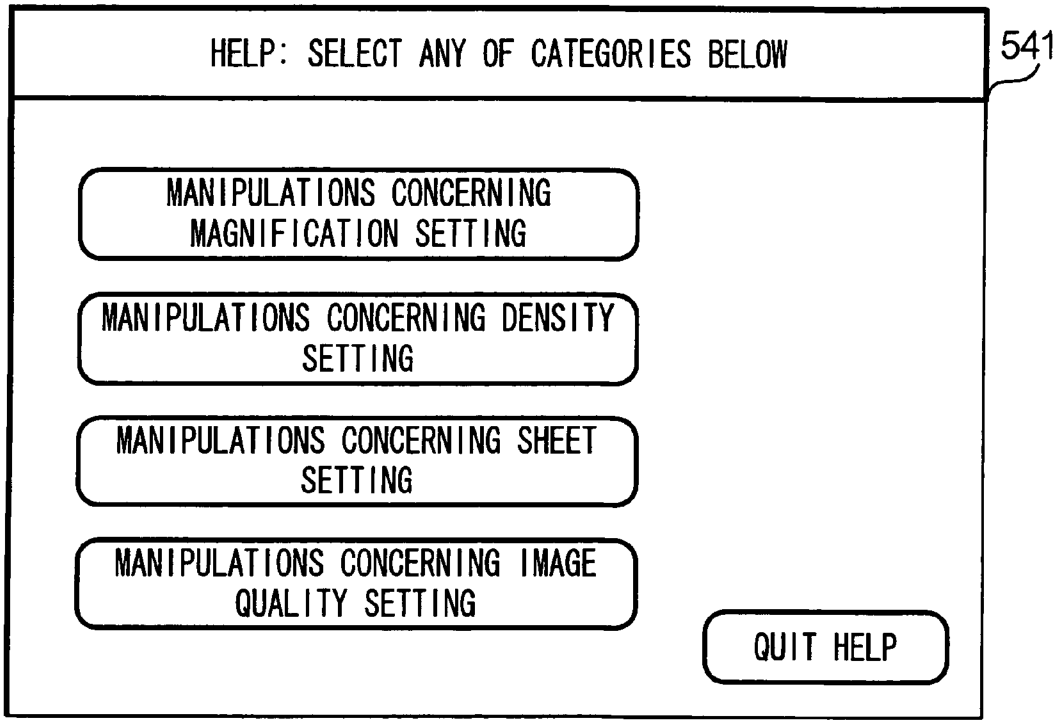
FIG. 13 also shows an example of images displayed on the touch panel of the image forming device.

Otherwise, if the instruction acceptance image BH is selected by the user, the controller 51 executes a processing operation corresponding to the help function. More specifically, the controller 51 obtains a manipulation signal corresponding to the instruction acceptance image BH, and then controls the touch panel 541 to display images for allowing the user to select a function about which the user wishes to receive an explanation. FIG. 13 shows an example of images which the touch panel 541 displays at this time. While the touch panel 541 shows these images, the user selects an instruction acceptance image corresponding to the function about which the user wishes to receive an explanation.

Figure 14:
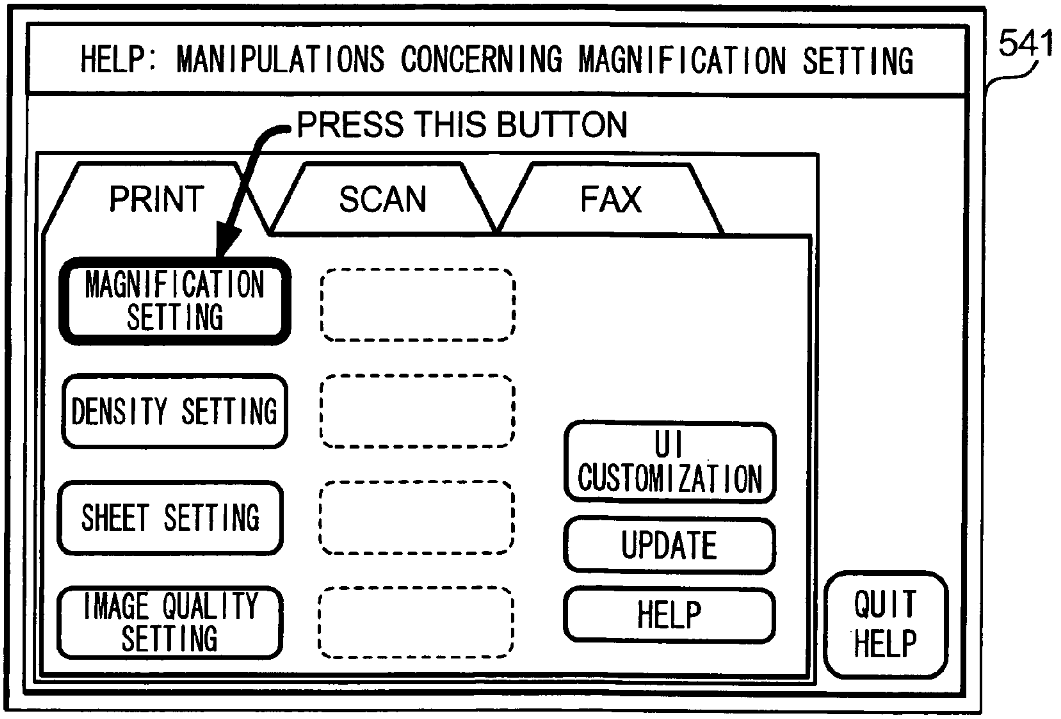
FIG. 14 also shows an example of images displayed on the touch panel of the image forming device.
Figure 15:
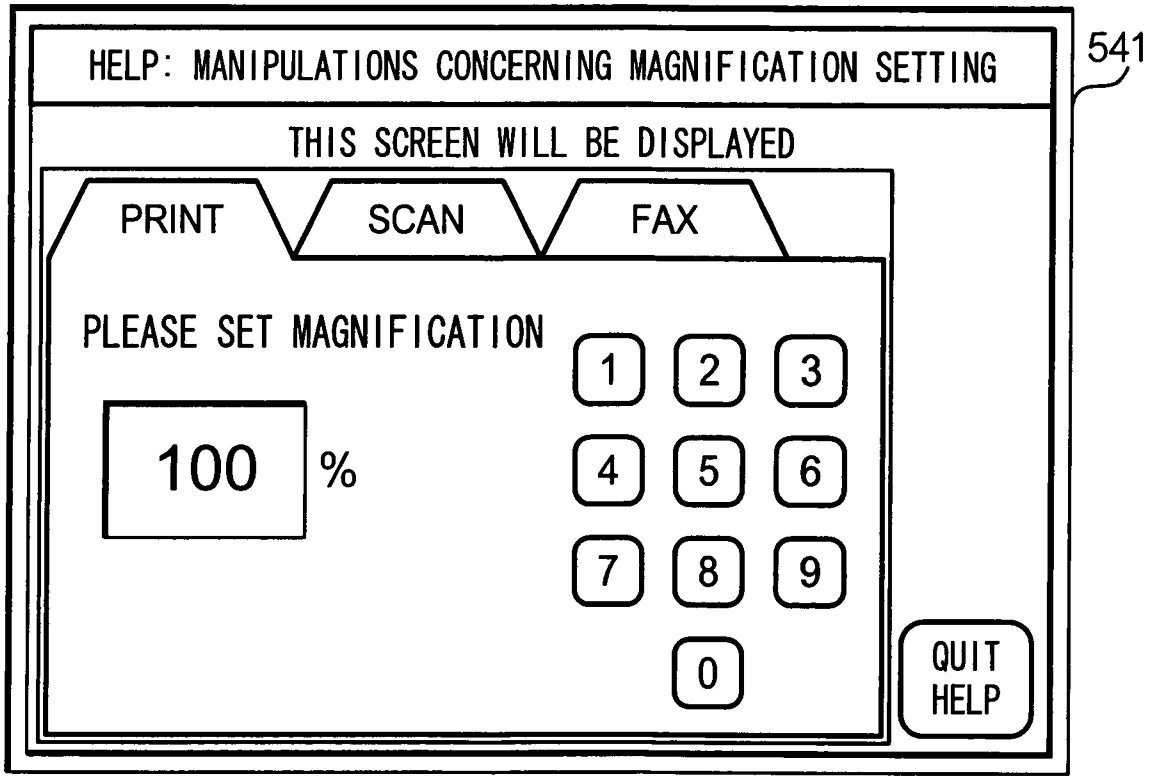
FIG. 15 also shows an example of images displayed on the touch panel of the image forming device.

If any of the instruction acceptance images is then selected, the controller 51 reads and outputs a manual data set corresponding to the selected instruction acceptance image from the storage unit 52. More specifically, the controller 51 reads a manipulation explanation data set and performs output in accordance with the manipulation explanation data set. Thereafter, the controller 51 reads a result explanation data set related to the manipulation explanation data set and performs output in accordance with the result explanation data set. For example, if the user selects an instruction acceptance image indicating "Manipulations concerning magnification setting" as shown in FIG. 13, the controller 51 controls the touch panel 541 to display images shown in FIGS. 14 and 15. FIG. 14 shows that an image for explanation of a manipulation required for setting a magnification is selected. FIG. 15 depicts transition of a screen of the touch panel 541 when a manipulation explained related to the selected image in FIG. 14 is carried out. That is, FIG. 14 shows a display state according to a manipulation explanation data, and FIG. 15 shows a display state according to a result explanation data set. The images shown in FIGS. 14 and 15 can be simultaneously displayed on the touch panel 541. Otherwise, the images shown in FIG. 15 can be displayed after the images shown in FIG. 14 are displayed. If there is an existing audio data set corresponding to any these images, such an audio data set can be supplied to the audio output unit 55.

Operations concerning the UI customization function, update function, and help function have been described above. While executing processing operations as described above, the controller 51 determines whether or not display states of the touch panel 541 have been changed or not by the UI customization function or the update function. If a change is made to a display state of the touch panel 541, the controller 51 updates a manual data set in accordance with the change. Described below will be a processing operation which is executed by the controller 51 when updating a manual data set.

Figure 16:
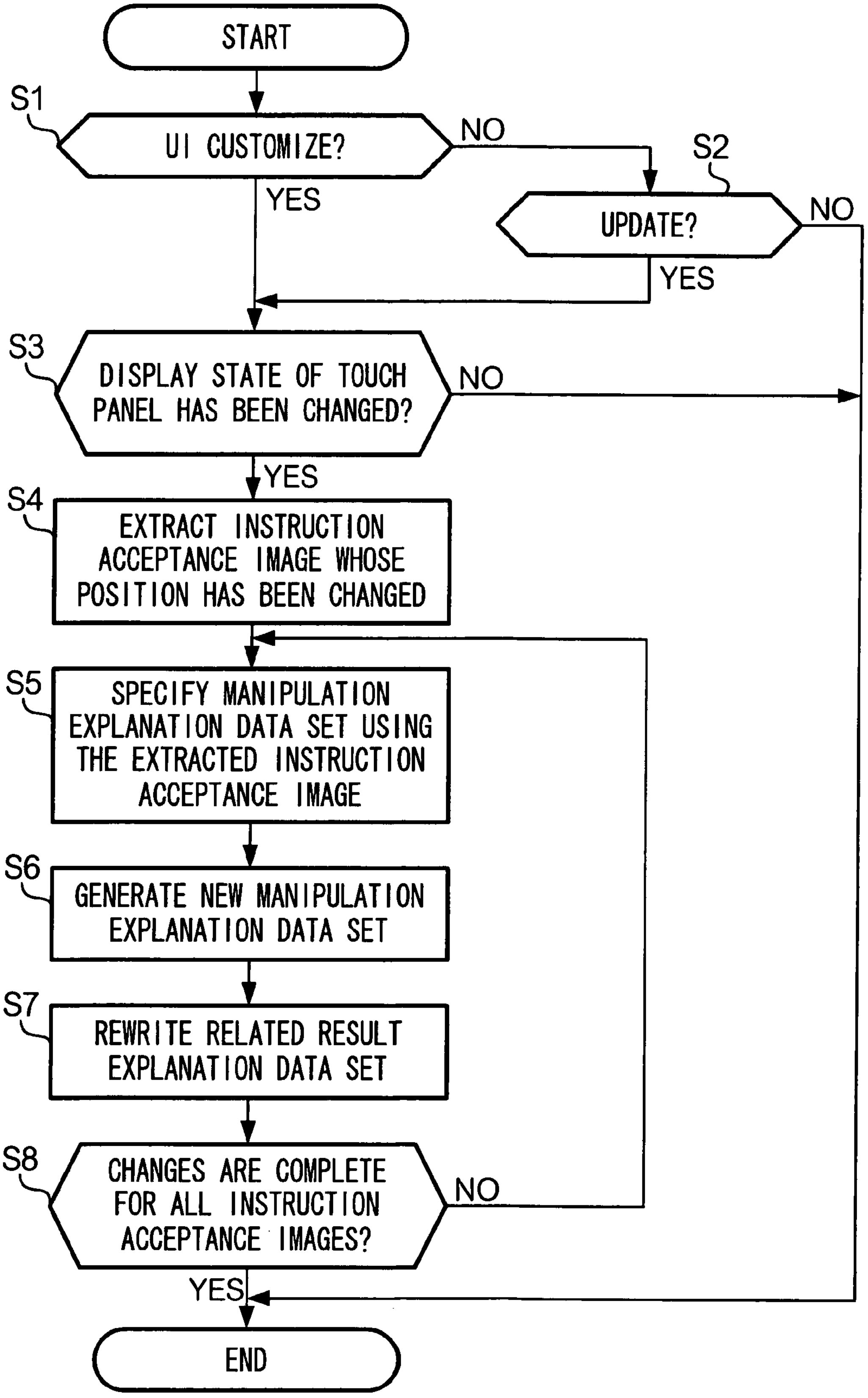
FIG. 16 is a flowchart showing a processing operation executed by a controller of the image forming device.

FIG. 16 is a flowchart showing a processing operation executed by the controller 51 to update a manual data set. The controller 51 executes this processing, triggered by execution of any processing operation carried out by a user. Description will be made below along the flowchart. The controller 51 determines first whether or not a processing operation for realizing the UI customization function or update function has been executed (steps S1 and S2). If a processing operation corresponding to any of these functions is determined to have been executed, the controller 51 then determines whether or not a display state of the touch panel 541 has been changed (step S3). If the processing operation executed by a user is not determined to be a processing operation corresponding to the UI customization function or the update function (step S1: NO or step S2: NO), the controller 51 terminates the present processing operation flow. If a processing operation corresponding to the UI customization function or the update function is determined to have been executed and if the display state of the touch panel 541 is not determined to have been changed (step S3: NO), the controller 51 terminates this processing operation flow.

Whenever the display state of the touch panel 541 has been changed (step S3: YES), the controller 51 has rewritten a layout data set stored in the storage unit 52. Based on content of the rewrite, the controller 51 then extracts any instruction acceptance image whose position has been rewritten (step S4). At this time, not only a single instruction acceptance image but also plural instruction acceptance images can be extracted. This is because the update function can simultaneously add plural instruction acceptance images, and the UI customization function can simultaneously change plural instruction acceptance images.

Subsequently, the controller 51 specifies a manipulation explanation data set using the extracted instruction acceptance image, from the manual data set stored in the storage unit 52 (step S5). More specifically, the controller 51 specifies a manipulation explanation data set which includes, in its own element reference area, identification information specific to a display data set (element data set) corresponding to the extracted instruction acceptance image. Such a manipulation explanation data set is specified because a content of such a manipulation explanation data set does not correspond to an actual display state of the touch panel 541.

After specifying the manipulation explanation data set, the controller 51 generates a new manipulation explanation data set, based on the manipulation explanation data set specified (step S6). To distinguish the manipulation explanation data set specified in the step S5 from the manipulation explanation data set newly generated in the step S6, the former and latter manipulation explanation data sets are respectively referred to as an "old manipulation explanation data set" and a "new manipulation explanation data set". More specifically, referring to the old manipulation explanation data set and a layout data set stored in the storage unit 52, the controller 51 generates an element reference area of the new manipulation explanation data, set out in a manner described below. That is, an unchanged part of the element reference area, which has not been changed from the old manipulation explanation data set, is directly copied from the old manipulation explanation data set, while a changed part of the element reference area is newly generated in accordance with the layout data. At this time, if the old manipulation explanation data set includes a manipulation explanation image, and if the manipulation explanation image is related to an instruction acceptance image whose position has been changed, the manipulation explanation image is moved in accordance with the move of the instruction acceptance image.

The controller 51 copies a history reference area from the old manipulation explanation data set and adds identification information specific to the old manipulation explanation data set, thereby to generate a history reference area of the new manipulation explanation data set. The controller 51 directly copies a content of a result reference area from the old manipulation explanation data set.

Subsequently, the controller 51 specifies a result explanation data set related to the new manipulation explanation data set generated in the step S6, and rewrites the content of the new manipulation explanation data set (step S7). More specifically, the controller 51 specifies a result of an explanation data set related to the new manipulation explanation data set, based on the identification information written in the result reference area of the new manipulation explanation data set generated in the step S6. The controller 51 further adds identification information of the old manipulation explanation data set to the history reference area of the new manipulation explanation data set, and rewrites the manipulation reference area of the result explanation data set with identification information of the new manipulation explanation data set. The controller 51 does not change the element reference area.

After changing the manual data in this manner, the controller 51 determines whether or not changes as described above have been made to all the instruction acceptance images extracted in the step S4 (step S8). If there still is any unchanged instruction acceptance image (step S8: NO), the processing operation is repeated from the step S5. Otherwise, if all instruction acceptance images have been changed completely (step S8: YES), this processing operation flow is terminated.

Figure 17:
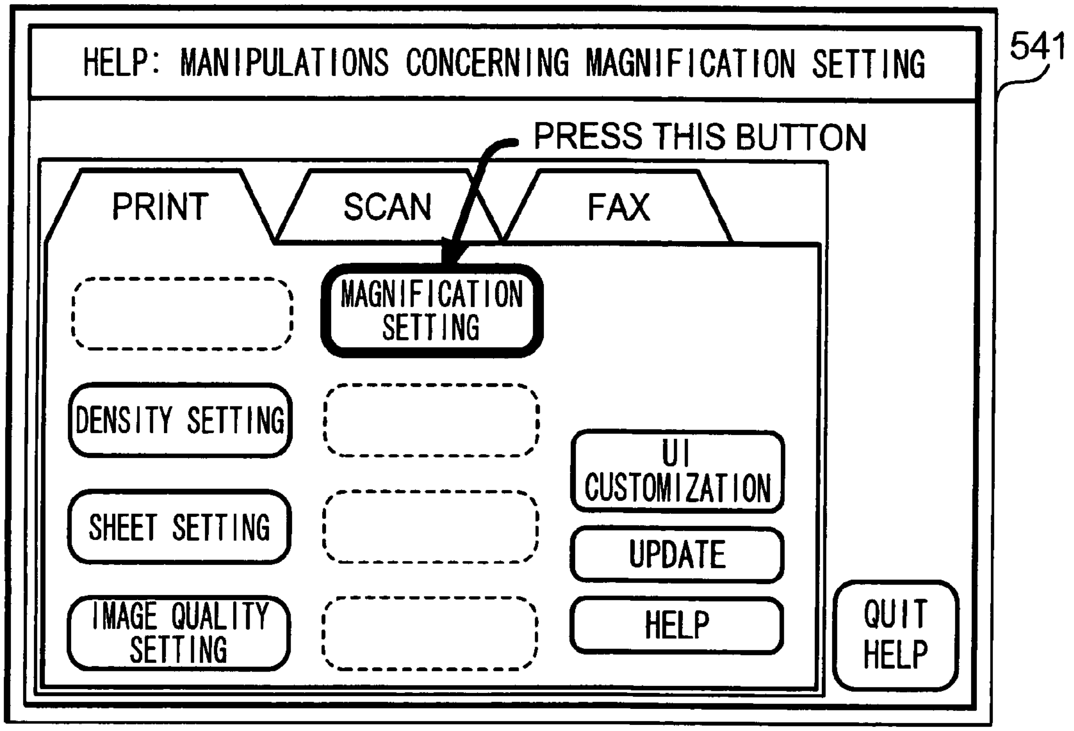
FIG. 17 shows an example of images displayed on the touch panel of the image forming device.

The update processing operation executed by the controller 51 has been described above. As a result of this processing, manipulation explanation data sets in a manual data set reflect changes to display states of the touch panel 541. Accordingly, content of manipulation explanation data sets is constantly matched with display states of the touch panel 541. For example, if an instruction acceptance image related to the magnification setting function is changed from a position shown in FIG. 10 to a position shown in FIG. 12, a manipulation explanation data set is updated, so that images displayed on the touch panel 541 according to the help function are changed from those shown in FIG. 14 to those shown in FIG. 17. Meanwhile, since phenomena resulting from conducted manipulations corresponding to the images are not changed, a display state according to a result explanation data set remains unchanged from the display state including the images as shown in FIG. 15.

(Modifications)

The exemplary embodiment described above is merely one practical form of the invention. In the invention, modifications described below are applicable to the above exemplary embodiment. The modifications below can be appropriately combined with each other for use.

(1) Modification 1

The above exemplary embodiment adopts a configuration of storing a history of each manipulation explanation data set. This configuration is intended to avoid generation of a new manipulation explanation data set when a manipulation, which will recover an original display state of the touch panel 541, is conducted. However, manipulation explanation data sets used in the past need not always be stored, and can be deleted. In a configuration modified in this way, neither a manipulation explanation data set nor a result explanation data set requires a history reference area.

(2) Modification 2

Also in the above exemplary embodiment, an area for mutual reference is provided in each of the manipulation explanation data sets and the result explanation data sets. By such areas, the manipulation explanation data sets and the result explanation data sets are related to each other. However, relationship information which describes such a relationship can be provided separately from the manipulation explanation data sets and result explanation data sets. Accordingly, if Modification 2 is combined with Modification 1, e.g., if no history is stored and if relationship information is provided independently, only the relationship information is required to be rewritten when a manual data set is updated.

(3) Modification 3

The above exemplary embodiment is configured so as to generate newly a manipulation explanation data set. However, unless a history is required to be stored, an existing manipulation explanation data set can be rewritten without newly generating a manipulation explanation data set. In this case, no manipulation reference area of any related result explanation data set is changed either before or after update of a manipulation explanation data set. That is, if the configuration is modified so as to rewrite a manipulation explanation data set without storing a history, a related result explanation data set is not changed either before or after update of a manipulation explanation data set, and a content of the related result explanation data set always remains the same.

(4) Modification 4

In the above exemplary embodiment, each manipulation explanation data set includes an element reference area which is supposed to describe relationships concerning time and positions with plural element data sets. The configuration of the exemplary embodiment can desirably be modified as follows. That is, such relationships concerning time and positions with plural element data sets are stored as information in the storage unit 52, and the controller 51 refers to the information, to perform output of a manipulation explanation data set. Such information is referred to as "relationship information" in the following, and an example of the relationship information will now be described.

The relationship information includes information indicative of a relationship between an instruction acceptance image and a relative position of a manipulation explanation image, a relationship between an instruction acceptance image and a size of a manipulation explanation image, and/or a timing at which a manipulation explanation image is displayed after an instruction acceptance image or the like is displayed. For example, the relationship information expresses a relative relationship between an instruction acceptance image and a manipulation explanation image, examples of which are: at what position a manipulation explanation image saying "Please press this button" is displayed; how large a size is of the manipulation explanation image showing "Please press this button" in relation to a particular instruction acceptance image; and for how many seconds the manipulation explanation image showing "Please press this button" is displayed for before this image is displayed after a particular instruction acceptance image is displayed.

The controller 51 refers to relationship information of the same relationship information before and after update of a manual data set, and then outputs a manipulation explanation data set. The controller 51 refers to relationship information stored in the storage unit 52 and generates a manipulation explanation data set while maintaining a relationship represented by the relationship information. The relationship information describes a relative relationship between an instruction acceptance image and a manipulation explanation data set. Therefore, even after a position, size, or timing of an instruction acceptance image is changed, the controller 51 displays or reproduces a manipulation explanation image at a position, size, or timing which are determined with respect to the instruction acceptance image. That is, each manipulation explanation image is changed following a change made to an instruction acceptance image when the manual data is updated.

(5) Modification 5

If a position or size of an instruction acceptance image is changed, the position or size of a manipulation explanation image is changed following the change made to the instruction acceptance image. However, even with a mechanical change made following the change made to an instruction acceptance image, a trouble can occur when the instruction acceptance image is displayed. Therefore, an appropriate area of the touch panel 541 is defined as an inhibited area where layout of a manipulation explanation image is inhibited. An adjustment can be made so as to inhibit manipulation explanation images from overlapping the inhibited area.

Figure 18:
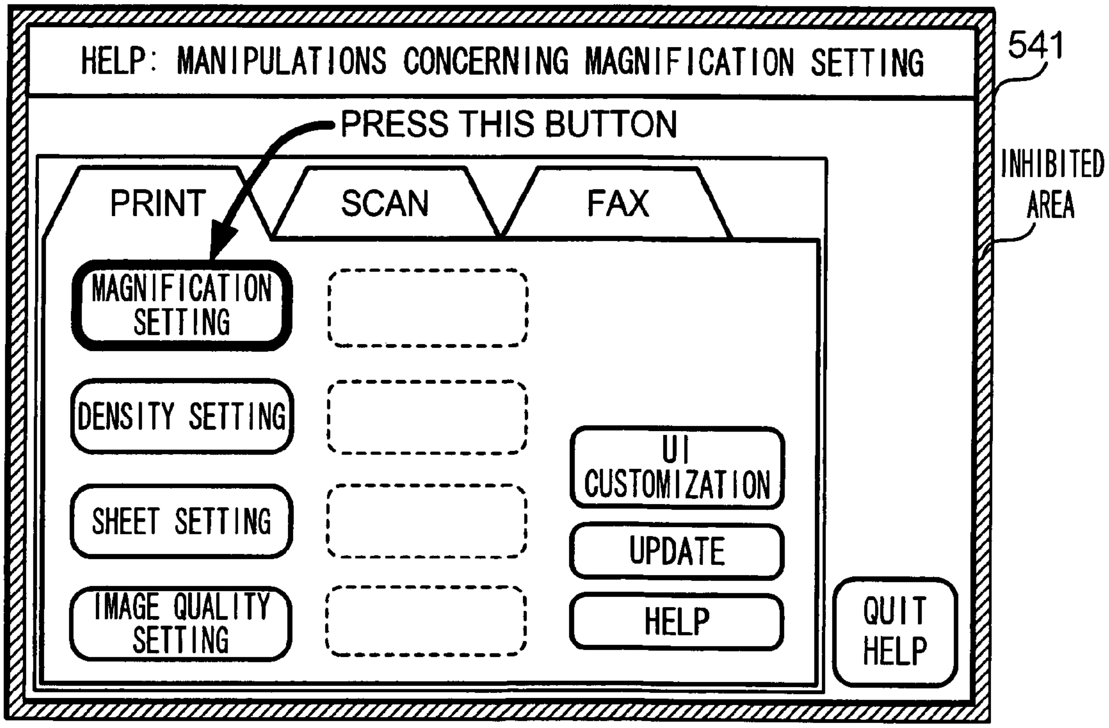
FIG. 18 also shows an example of images displayed on the touch panel of the image forming device.

FIG. 18 shows an example of images displayed on the touch panel 541, e.g., an example of an inhibited area. In this figure, a hatched area is defined as the inhibited area. In the example of this figure, if a user moves an instruction acceptance image B11 displayed as "magnification setting" to a position of B12 denoted by a broken line and if the controller

Figure 19:
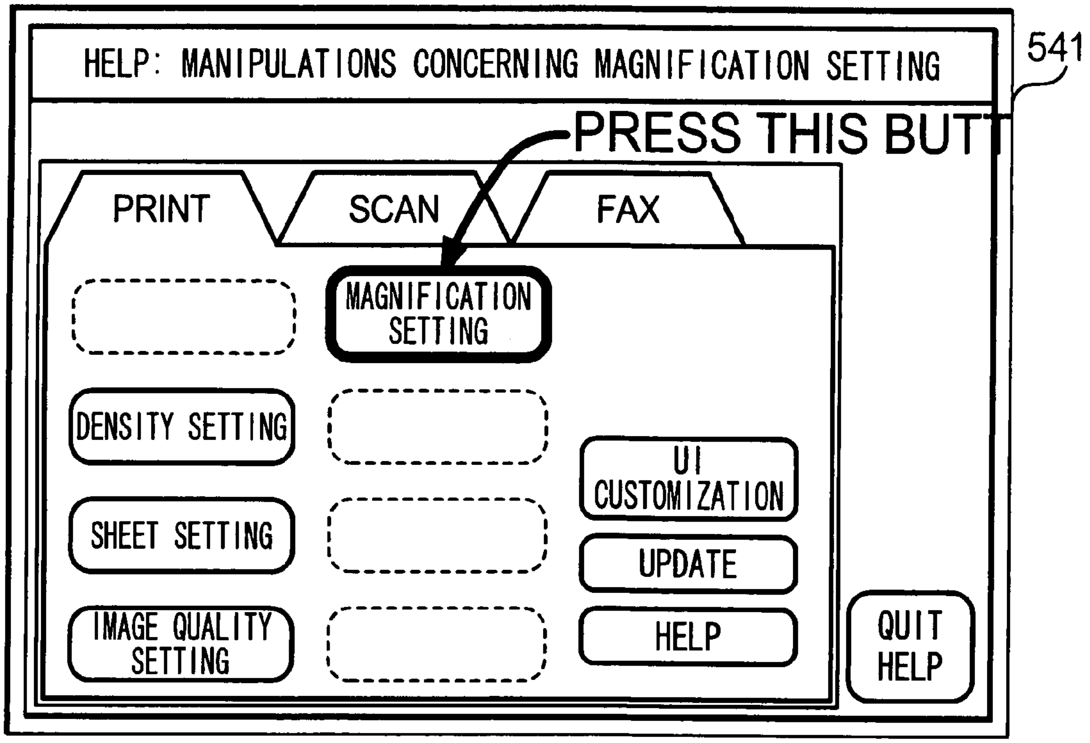
FIG. 19 also shows an example of images displayed on the touch panel of the image forming device.

51 mechanically moves another manipulation explanation image D11 displayed as "Press this button" so as to follow the moved instruction acceptance image B11, the entire manipulation explanation image D11 should be moved out to a position which is not shown within the touch panel 541 (see FIG. 19)

In such a case, the controller 51 can appropriately adjust positions, sizes, and/or shapes of manipulation explanation images. More specifically, the controller 51 determines whether or not the moved manipulation explanation image overlaps with the inhibited area as described above. If it is determined that the manipulation explanation image does overlap with the inhibited area, at least one of the position, size, and shape of the manipulation explanation images can be adjusted so as to avoid overlapping over the inhibited area.

Figure 20:
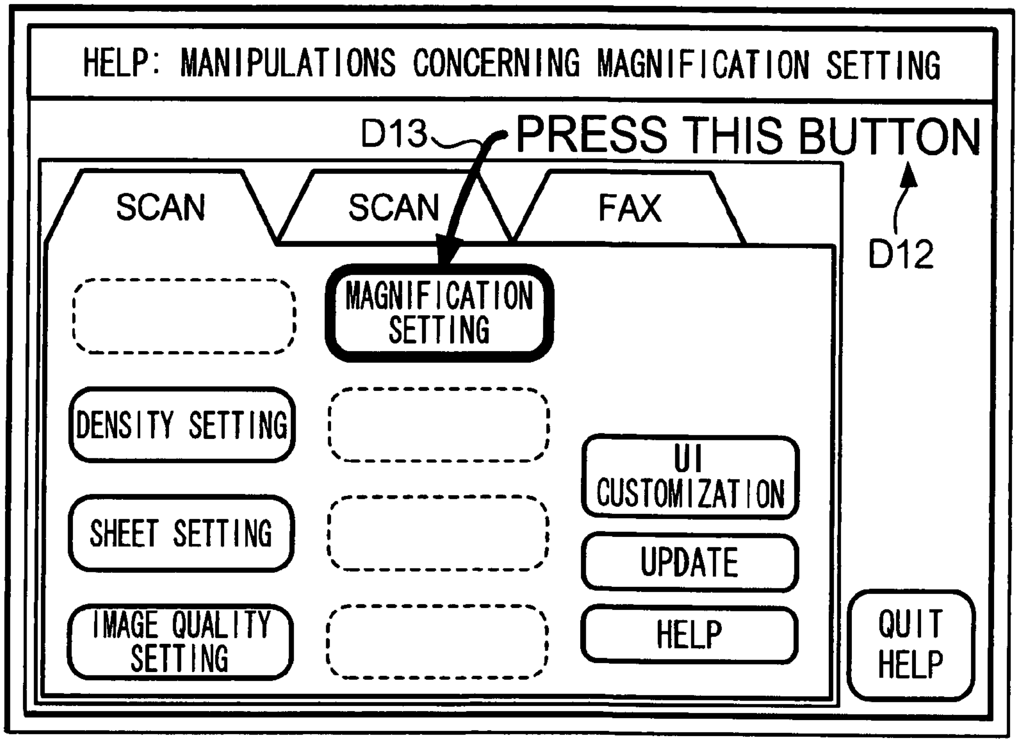
FIG. 20 also shows an example of images displayed on the touch panel of the image forming device.
Figure 21:
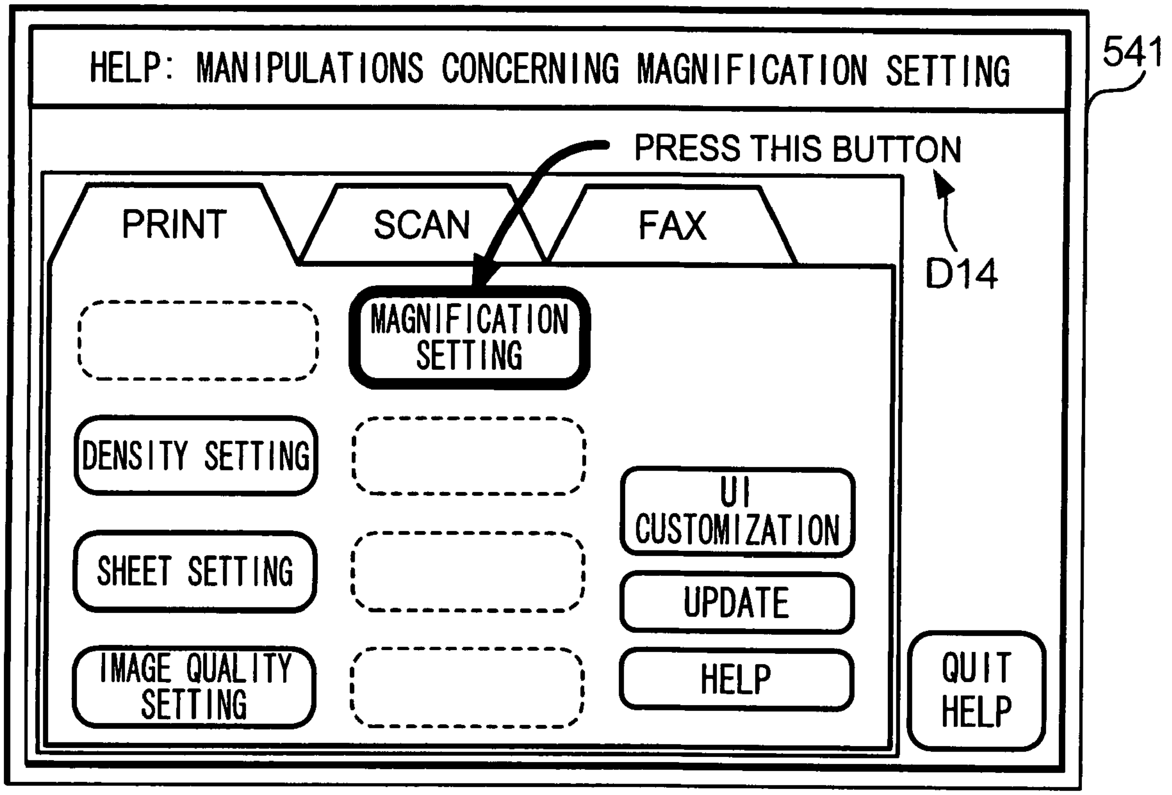
FIG. 21 also shows an example of images displayed on the touch panel of the image forming device.

FIGS. 20 and 21 show examples of adjustments performed by the controller 51. FIG. 20 shows a case of adjusting a position and a shape of manipulation explanation images. FIG. 21 shows a case of adjusting a size of a manipulation explanation image. In FIG. 20, the position of a manipulation explanation image D12 displayed as "Press this button" and the shape of an arrow-type manipulation explanation image D13 are adjusted. In FIG. 21, the size of a manipulation explanation image D14 displayed as "Press this button" is adjusted.

(6) Modification 6

Although the exemplary embodiment as described above does not particularly limit the format of the manual data, the manual data can have a format originally defined internally by the image forming device 50 or any other general-purpose format. If a general-purpose format is used, for example, a HTML format or PDF format is used desirably.

(7) Modification 7

If the manual data is stored in a general-purpose format, the manual data can be output by the image forming unit 58 or to the outside through the communication unit 53. In this case, there can be considered a further modification in addition to the modification described above in which the manual data is output in the HTML format or PDF format. The further modification is such that, for example, a manual data set is written in the same format as e-mails and is output to an external device such as a client device 40. Alternatively, a manual data set can be stored so that the manual data set can be referred to by an external device such as a client device 40. To allow external devices to refer to the manual data, for example, the image forming device 50 can be equipped with a function as a server device.

Even if the manual data set is not stored in a general-purpose format, the function as described above can be realized in so far as the manual data set once stored can be converted into a general-purpose format.

(8) Modification 8

In the above exemplary embodiment, a case of changing the position of an instruction acceptance image has been described as a modified configuration of display states of the touch panel 541. However, modified configurations of display states are not limited to the described case. For example, shapes of instruction acceptance images or texts displayed as instruction acceptance images can be changed, or a display state of an image other than instruction acceptance images can be changed.

(9) Modification 9

In the above exemplary embodiment a case has been described in which a new function is added by the update function. However, if a new function is added, there is a possibility that a manual data set related to the new function will not be included. In such a case, the configuration can be modified so that the image forming device 50 can obtain software stored in the update server 30, with a manual data set included in the software.

(10) Modification 10

The above exemplary embodiment adopts a configuration such that the image forming device 50 internally performs update of a manual data set. However, update of a manual data set can be carried out by an external device. For example, an external device can update a manual data set if the external device has: a unit for storing a manual data set; a unit for inputting and outputting data which the touch panel 541 deals with; and a unit for changing a manual data set. The unit for inputting and outputting data which the touch panel 541 deals with includes: a unit for supplying the touch panel 541 with image data including instruction acceptance images; a unit for outputting the stored manual data set; and a unit for accepting a change made to a display state of instruction acceptance images on the touch panel 541.

(11) Modification 11

The processing operation described above for updating the manual data can be realized by a program. Therefore, the program can be provided in form of a recording medium such as an optical disk or magnetic disk on which the program is stored. Needless to say, the program can be provided by allowing other image forming devices or computers to download the program from a server device.

(12) Modification 12

In the above exemplary embodiment, the "help function" has been described as a function to explain manipulations required for realizing functions of the image forming device 50 and to explain phenomenon resulting from the manipulations. However, the "help function" can be used to explain manipulations required for realizing functions of a computer device equivalent to the client device 40 and further functions of other information devices, and to explain phenomenon resulting from the manipulations of those devices as well.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated.

What is claimed is:

1. A data processing device comprising:

a display device including a display screen that displays:

an instruction acceptance image that is an image displayed on the display screen to describe an instruction related to a predetermined processing operation; and an explanation that is another image displayed on the display screen to explain manipulation of the instruction acceptance image to input the instruction, wherein an instruction acceptance unit accepts the instruction inputted by the manipulation for the data processing device or an external device to execute the instruction related to the predetermined processing operation;

a change unit that changes a display aspect of the instruction acceptance image displayed on the display screen, wherein the change unit accepts a change in the display aspect of the instruction acceptance image that corresponds to a change in a display aspect of the explanation displayed using display data; and a control unit that changes a display aspect of the explanation so as to correspond to the display aspect of the instruction acceptance image changed by the change unit, wherein the control unit generates data used for displaying the explanation that is being changed in accordance with the display aspect of the instruction acceptance image changed by the change unit, stores the data in a storage unit, and controls the display device to display the explanation using the data stored in the storage unit, the storage unit storing the display data including data used for displaying the instruction acceptance image.

2. The data processing device according to claim 1, wherein the control unit updates the data stored in the storage unit.

3. The data processing device according to claim 1, wherein an explanation is displayed on the display screen in response to an instruction that instructs to display the explanation.

4. A data processing device comprising:

a display device including a display screen that displays:

an instruction acceptance image that is an image displayed on the display screen to describe an instruction related to a predetermined processing operation;

an explanation that is another image displayed on the display screen to explain manipulation of the instruction acceptance image to input the instruction, wherein an instruction acceptance unit accepts the instruction inputted by the manipulation for the data processing device or an external device to execute the instruction related to the predetermined processing operation;

an arrangement relation between the instruction acceptance image and the explanation;

a change unit that changes a display aspect of the instruction acceptance image displayed on the display screen, wherein the change unit accepts a change in the display aspect of the instruction acceptance image that corresponds to a change in a display aspect of the explanation displayed using display data; and a control unit that changes a display aspect of the explanation so as to correspond to the display aspect of the instruction acceptance image changed by the change unit that the arrangement relation is maintained, wherein the control unit generates data used for displaying the explanation that is being changed in accordance with the display aspect of the instruction acceptance image changed by the change unit, stores the data in a storage unit, and controls the display device to display the explanation using the data stored in the storage unit, the storage unit storing the display data including data used for displaying the instruction acceptance image, and the arrangement relation.

5. The data processing device according to claim 4, wherein the control unit changes, when at least a part of the explanation overlaps a display prohibited area on the display screen, the data used for displaying the explanation so that any part of the explanation does not overlap the display prohibited area, and performs control of the display according to the changed data.

6. The data processing device according to claim 4, wherein an explanation is displayed on the display screen in response to an instruction that instructs to display the explanation.

7. A method for processing data comprising:

displaying an instruction acceptance image on a display screen to describe an instruction related to a predetermined processing operation;

displaying an explanation that is another image on the display screen to explain manipulation of the instruction acceptance image to input the instruction for executing the instruction related to the predetermined processing operation;

accepting the instruction inputted by the manipulation for an own device or an external device;

changing a display aspect of the instruction acceptance image displayed on the display screen by a change unit, wherein the change unit accepts a change in the display aspect of the instruction acceptance image that corresponds to a change in a display aspect of the explanation displayed using display data; and controlling a display aspect of the explanation by a control unit so as to correspond to the display aspect of the instruction acceptance image changed, wherein the control unit generates data used for displaying the explanation that is being changed in accordance with the display aspect of the instruction acceptance image changed by the change unit, stores the data in a storage unit, and controls the display device to display the explanation using the data stored in the storage unit, storing the display data including data used for displaying the instruction acceptance image in the storage unit.

8. The method for processing data according to claim 7 further comprising:

displaying an explanation on the display screen in response to an instruction that instructs to display the explanation.

9. A computable-readable recording medium storing a program causing a computer execute:

displaying an instruction acceptance image on a display screen to describe an instruction related to a predetermined processing operation;

displaying an explanation that is another image on the display screen to explain manipulation of the instruction acceptance image to input the instruction for executing the instruction related to the predetermined processing operation;

accepting the instruction inputted by the manipulation for an own device a data processing device or an external device;

changing a display aspect of the instruction acceptance image displayed on the display screen by a change unit, wherein the change unit accepts a change in the display aspect of the instruction acceptance image that corresponds to a change in a display aspect of the explanation displayed using display data; and controlling a display aspect of the explanation by a control unit so as to correspond to the display aspect of the instruction acceptance image changed, wherein the control unit generates data used for displaying the explanation that is being changed in accordance with the display aspect of the instruction acceptance image changed by the change unit, stores the data in a storage unit, and controls the display device to display the explanation using the data stored in the storage unit, storing the display data including data used for displaying the instruction acceptance image in the storage unit.

10. The computable-readable recording medium according to claim 9 to execute:

displaying an explanation on the display screen in response to an instruction that instructs to display the explanation.

11. A computable-readable recording medium storing a program causing a computer execute:

displaying an instruction acceptance image on a display screen to describe an instruction related to a predetermined processing operation;

displaying an explanation that is another image on the display screen to explain manipulation of the instruction acceptance image to input the instruction for executing the instruction related to the predetermined processing operation;

arrangement a relation between the instruction acceptance image and the explanation;

accepting the instruction inputted by the manipulation for an own device a data processing device or an external device;

changing a display aspect of the instruction acceptance image displayed on the display screen by a change unit, wherein the change unit accepts a change in the display aspect of the instruction acceptance image that corresponds to a change in a display aspect of the explanation displayed using display data; and controlling a display aspect of the explanation by a control unit so as to correspond to the display aspect of the instruction acceptance image changed that the relation is maintained, wherein the control unit generates data used for displaying the explanation that is being changed in accordance with the display aspect of the instruction acceptance image changed by the change unit, stores the data in a storage unit, and controls the display device to display the explanation using the data stored in the storage unit, storing the display data including data used for displaying the instruction acceptance image, and the relation in the storage unit.

12. The computable-readable recording medium according to claim 11 to execute: displaying an explanation on the display screen in response to an instruction that instructs to display the explanation.

* * * * *